Figure 1:
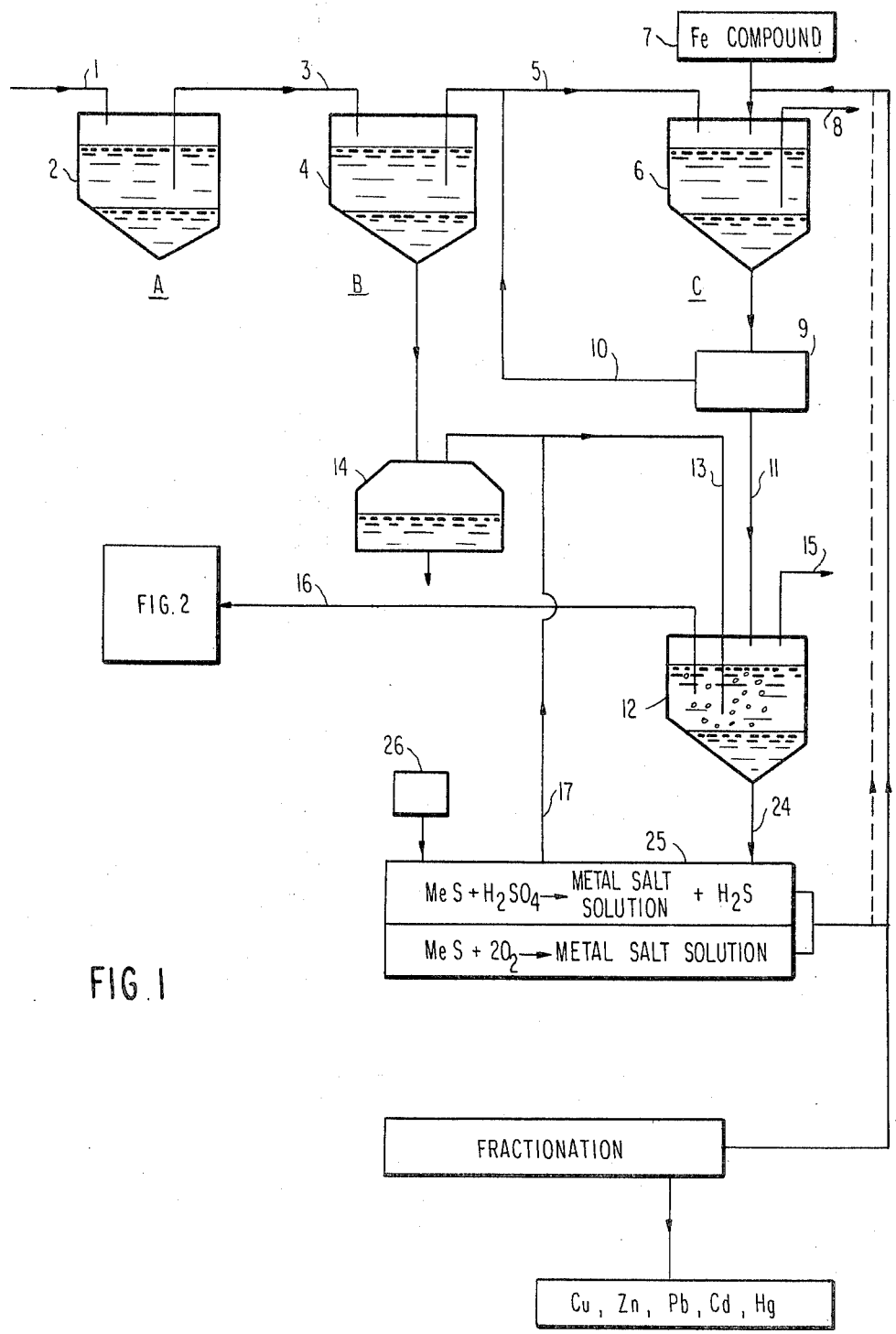

United States Patent [19]

Ripl et al.

[11] 4,416,779

[45] Nov. 22, 1983

[54] METHOD FOR PRODUCING AN AQUEOUS SOLUTION OF HIGH PHOSPHOROUS CONTENT

[76] Inventors: Wilhelm K. Ripl, Bernadollestrasse 72, 1000 Berlin 33, Fed. Rep. of Germany; Bo L. Verner, Belgielei 127, 2000 Antwerpen, Belgium

[21] Appl. No.: 425,779

[22] Filed: Sep. 28, 1982

[30] Foreign Application Priority Data

Nov. 24, 1981 [SE] Sweden .................................. 8106992

[51] Int. Cl.³ .............................................. C02F 3/28
[52] U.S. Cl. ..................................... 210/603; 210/609; 210/631; 210/906; 210/912; 423/158; 423/305
[58] Field of Search ............... 210/630, 603, 612, 631, 210/610, 611, 912, 906, 711, 712, 716, 609; 423/158, 160, 305

[56] References Cited

U.S. PATENT DOCUMENTS

| | | | |
|---|---|---|---|
| 4,042,493 | 8/1977 | Matsch et al. | 210/630 |
| 4,141,822 | 2/1979 | Levin et al. | 210/630 |
| 4,183,808 | 1/1980 | Drnevich | 210/630 |
| 4,200,523 | 4/1980 | Balmat | 210/631 |
| 4,354,937 | 10/1982 | Hallberg | 210/912 |

FOREIGN PATENT DOCUMENTS

| | | | |
|---|---|---|---|
| 55-155789 | 12/1980 | Japan | 210/906 |
| 56-65693 | 6/1981 | Japan | 210/906 |

*Primary Examiner*—Benoit Castel
*Attorney, Agent, or Firm*—Sughrue, Mion, Zinn, Macpeak and Seas

[57] ABSTRACT

The invention relates to a method of producing an aqueous solution rich in phosphorous and recovering metal compounds in the purification of sewage-water or raw-water, in a plant which includes at least one chemical treatment stage in which an iron compound is supplied to the water to precipitate phosphorous present therein. The method is characterized in that the sludge from the chemical treatment stage is treated with hydrogen sulphide under anaerobic conditions, phosphorous compounds being dissolved from the sludge and metal sulphide being formed. The metal sulphides are dissolved to form metal salt solutions, of which at least the iron salt solution is separated and recycled to the chemical treatment stage. It is also possible prior to separating the iron salt solutions to recycle the metal salt solutions one or more times. The dissolved phosphorous can be removed in the form of an aqueous solution and treated in accordance with the so-called Donnert-process, to form calcium phosphate.

5 Claims, 2 Drawing Figures

METHOD FOR PRODUCING AN AQUEOUS SOLUTION OF HIGH PHOSPHOROUS CONTENT

The present invention relates to a method for producing an aqueous solution of high phosphorous content, recovering iron compounds constituting precipitating agents, and separating heavy metals in a sewage-water or raw-water purification plant, said plant including at least one chemical treatment stage in which an iron compound is introduced into the sewage-water or raw-water to precipitate phosphorous present therein.

Many attempts have been made to utilize the sludge obtained in the chemical treatment stage, which normally constitutes a third stage in a water treatment works, as a soil improving agent which is applied directly to the soil. The sludge has a high water content and contains only relatively small quantities of phosphorous. The costs incurred in transporting the sludge are high and its value as a fertilizer low.

It has been noticed in recent years that the sludge contains heavy metals which are taken up in the crops, and ultimately stored in animals and humans partaking thereof.

A process called the Donnert-process has been developed to produce a fertilizer rich in phosphorous, on the basis of the water obtained subsequent to the biological treatment stage, when normally only 20–50% of phosphorous is present in the biological sludge. In this process, which is described, for example, in DE Offenlegungsschrift 27 21 298, the water obtained from the biological treatment stage is treated with active aluminium oxide, sodium hydroxide and lime, the end product being calcium phosphate. Because of the excessively low phosphorous content of the water from the biological treatment stage, however, the process has been found uneconomical.

Accordingly, a prime object of the invention is to provide a method which enables substantial pre-concentration of the phosphorous contained in the sludge obtainable from the chemical stage, thereby to enable the Donnert-process to be carried out with good economy.

This object is realized by the method according to the invention, which is mainly characterized by treating the chemical aqueous sludge formed by precipitation with salts of iron in the chemical treatment stage with hydrogen sulphide in a subsequent treatment stage under anaerobic conditions, phosphorous compounds released from the sludge and metal sulfides being formed; conducting away the resultant phosphorous-containing solution; causing the metal sulphides to progressively dissolve to form metal salt solutions, by lowering the pH with a strong acid, by which is also meant solutions of salts of iron, for example an iron-chloride solution; fractionating the solutions of the salts of iron; and recycling salts of iron present in said solutions to the chemical treatment stage.

In accordance with one embodiment of the invention, the metal salt solutions formed can be recycled to the chemical treatment stage before being fractionated. In this case, the salts of iron, hereinafter generally referred as iron salts, accompanying the recycled solutions are effective in the precipitation of phosphorous. Fractionation need not then be effected until a high concentration of undesirable or toxic metal sulphides is reached, whereupon the iron-salt solutions are recovered first and recycled to the chemical treatment stage, while separating, for example, other metals, substantially in the form of heavy metal sulphides, such as copper sulphide, cadmium sulphide and mercury sulphide, and recovering said metals and removing them from the system.

The sludge water, which is obtained in the anaerobic process after conversion of the metal compounds to metal sulphides, and whose phosphorous content is approximately 200 times greater than the input phosphorous to be the third treatment stage, is decanted in accordance with the invention and this sludge water treated in accordance with the Donnert-process. This renders the Donnert-process attractive from a commercial aspect. The good economy is a result of the possibility of returning to the chemical third stage, in accordance with the invention, at least 80% of the iron compound used as a precipitating chemical.

Figure 2:
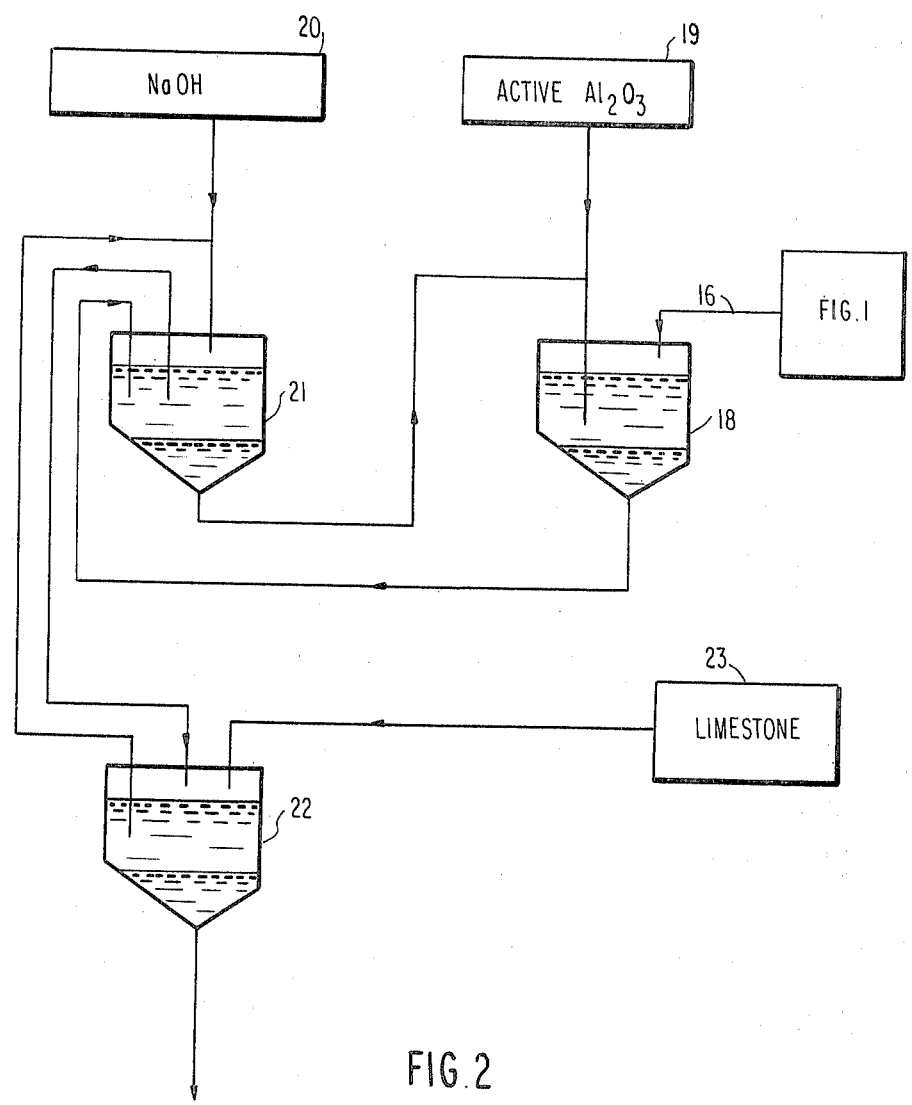

The invention will now be described in more detail with reference to the accompanying drawings, in which FIG. 1 illustrates in a simple manner a plant for carrying out the method according to the invention, and FIG. 2 is a simplified illustration of the Donnert-process.

In FIG. 1 there is shown a line 1 through which sewage-water is passed to a first treatment stage A, which in the illustrated embodiment has the form of a vessel 2. In this purifying stage, coarse particles, oil etc. are removed from the sewage-water, and the sewage-water is also optionally aerated. The sewage-water, which is now free from coarse particles, oil etc. is transferred from stage A through a line 3 to a biological treatment stage B, in which the sewage-water is subjected to a biological purifying process under the action of microorganisms and oxygen, during which process the active biological sludge settles on the bottom of the vessel 4 of the stage. The sewage-water, which is now cleaned of biological material and which contains phosphorous and partly toxic metal compounds, is fed through a line 5 to a chemical treatment stage C. In this treatment stage, which also has the form of a vessel in the illustrated embodiment, there is added a given quantity of an iron compound, for example iron chloride or iron sulphate, from a store 7. The iron compounds cause phosphorous to precipitate. The sludge, which collects on the bottom of the vessel 6, will also contain the major part of the toxic metal compounds. The purified sewage-water is taken out through a line 1, and the aqueous sludge is optionally transferred to a decanting means 9, in which the water is separated and recycled to the vessel 6, through a line 10. The sludge is then passed through a line 11 to a further treatment stage in accordance with the invention, which, as with the previous stage is, as illustrated, in the form of a vessel, referenced 12, in which the input sludge is treated under anaerobic conditions. In accordance with the invention, hydrogen sulphide, $H_2S$, is fed into the vessel 12 and allowed to bubble through through the aqueous sludge. The hydrogen sulphide enters the vessel 12 through a line 13. In the illustrated embodiment hydrogen sulphides are generated in a digestion chamber 14, in which biological sludge from the biological treatment stage B passes through a digestion process, $H_2S$ and $CH_4$ being generated therewith. The methane gas is cleansed from the hydrogen sulphide by bubbling it through the sludge, and is removed through a line 15. When the hydrogen sulphide in the anaerobic environment comes into contact with the metal compounds in the sludge, the compounds are converted to metal sulphides, MeS. Since metal sulphides have no phosphorous-binding properties, the phosphorous, which was previously bound to the metal compounds, dissolve in the water, thereby to obtain a solution rich in phosphorous. The aqueous solution rich in phosphorous is separated from the sludge rich in metal sulphide on the bottom of the vessel 12, and is led away through a line 16 for further treatment, for example, in accordance with the Donnert-process. The sludge is passed through a line 24 to a vessel 25 and is then treated either with a strong acid taken from a store 26, for example sulphuric acid or an iron salt solution, such as iron chloride solution, there being formed metal salt solutions and hydrogen sulphide, or there is also effected an oxidizing process to convert the sulphide to sulphate. When hydrogen sulphide is generated, this is used to treat the sludge in the vessel 12 and enters the vessel 12 through a line 17. The metal sulphides are treated so that the iron sulphide, which is that most quickly converted to iron salt solution, is first fractionated and recycled to stage C, whereafter any heavy metal sulphides present are also converted in sequence and recovered. It is also possible to recycle the metal salt solutions to the stage C one or more times prior to the fractionating process, and to delay said fractionating process until a desired high concentration of heavy metal sulphides has been obtained.

As before mentioned, an object of the present invention is to render the known Donnert-process economical, by supplying an aqueous solution of phosphorous substances in high concentration. This solution is the solution taken out through the line 16 and fed to a vessel 18. Activated aluminium oxide from a store 19 is supplied to the vessel 18, the phosphorous being adsorbed on the aluminium-oxide granules. The consumed aluminium-oxide is fed to a vessel 21 and regenerated with sodium hydroxide taken from a store 20. The phosphorous solution is passed from vessel 21 to a vessel 22, and precipitation is effected by supplying lime from a store 23. The sodium hydroxide is then recycled from the vessel 23 to the vessel 21, and to the vessel 18. Ideally, no other substance than lime need be consumed.

Sludge comprising substantially calcium phosphate is taken from the vessel 22.

A treatment according to the Donnert-process and dependent on the invention can be carried out in a mobile plant for recovering enriched phosphorous solutions from smaller purifying plants.

We claim:

1. A method for producing an aqueous solution of high phosphorous content, and for recovering metal compounds in a plant for purifying sewage-water or raw-water, said plant including at least one chemical treatment stage in which an iron compound is introduced into the sewage-water or raw-water to produce a chemical aqueous sludge containing precipitated phosphorous, the improvement which comprises treating the chemical aqueous sludge formed in the chemical treatment stage with hydrogen sulphide in a subsequent treatment stage under anaerobic conditions to dissolve the phosphorous in the water and to form a sludge containing metal sulphide, conducting away the resultant phosphorous-containing water; dissolving the metal sulphides to form metal salt solutions by adding a strong acid to the metal sulfide-containing sludge; and separating at least an iron salt solution of the metal salt solutions and recycling said iron salt solution to the chemical treatment stage.

2. A method according to claim 1, comprising recycling the metal salt solutions to the chemical treatment stage at least once prior to separating the iron salt solution.

3. A method according to claim 1 or claim 2, comprising separating water from the sludge after treatment in the chemical treatment stage, and returning said water to said stage, while transferring the aqueous sludge to said subsequent treatment stage.

4. A method according to claim 1, wherein the dissolving step results in hydrogen sulphide and the resultant hydrogen sulphide is fed to said subsequent stage.

5. A method according to claim 1, comprising taking the dissolved phosphorous in the form of an aqueous solution from said subsequent stage and precipitating said phosphorous with lime to form calcium phosphate.

* * * * *